United States Patent Office 2,967,511
Patented Jan. 10, 1961

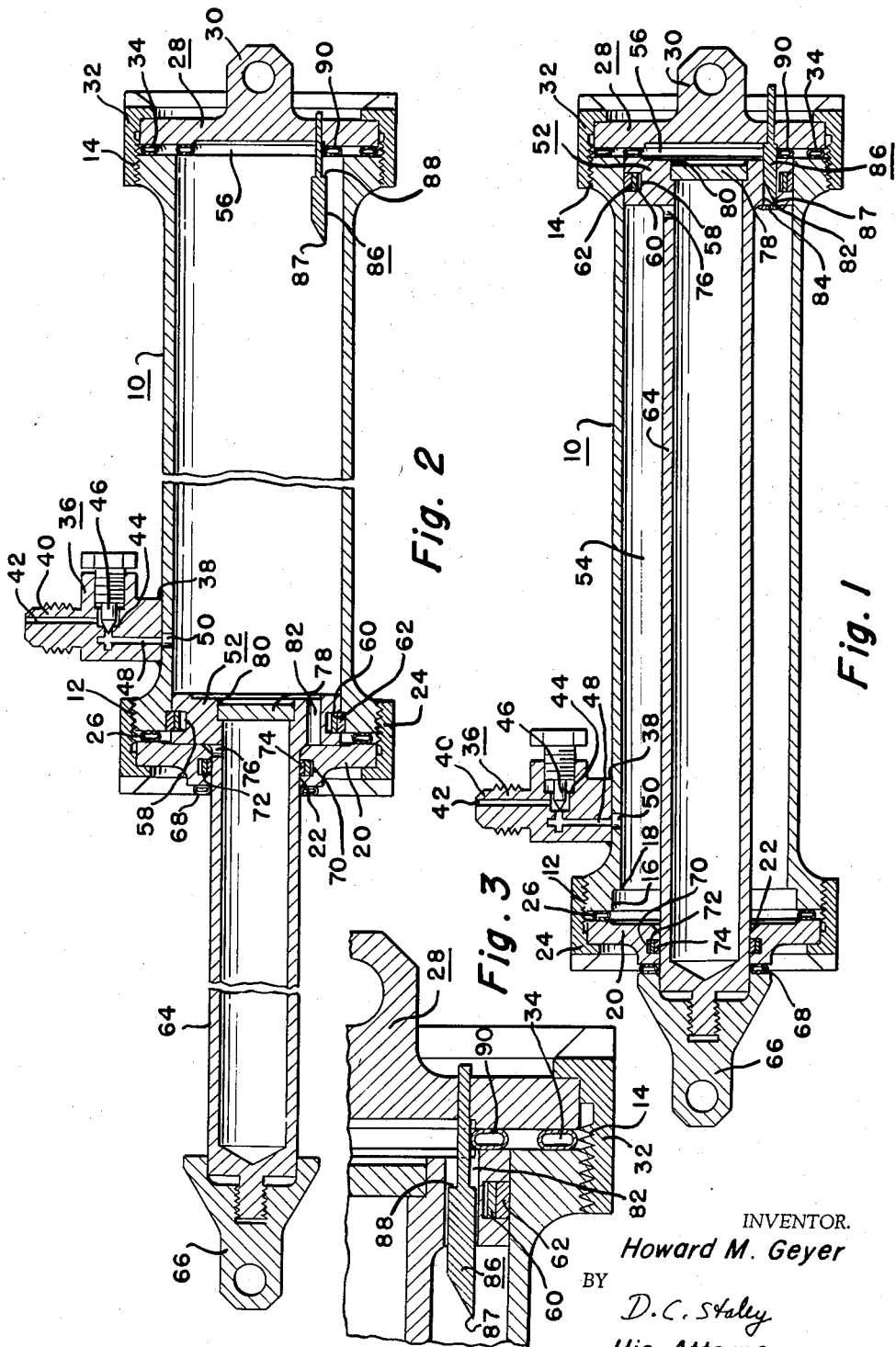

2,967,511

PNEUMATIC ACTUATOR

Howard M. Geyer, Dayton, Ohio, assignor to General Motors Corporation, Detroit, Mich., a corporation of Delaware Filed June 9, 1958, Ser. No. 740,846

10 Claims. (Cl. 121—40)

This invention pertains to actuators, and particularly to pneumatically operated linear actuators.

In actuators designed for rocket applications, it is only necessary to effect a single operation of the actuator. Accordingly, the actuators must be economical to manufacture, reliable in operation, and in addition include means for locking the actuator in the fully extended position. The present invention relates to a pneumatically operated linear actuator having stroke end locking means and a control system for such an actuator. Accordingly, among my objects are the provision of a pneumatically operated linear actuator having stroke end locking means; the further provision of a pneumatically operated linear actuator having differential piston areas and means for interconnecting the actuator chambers on opposite sides of the piston; and the still further provision of a control system for an actuator of the aforesaid type including means for supplying gaseous medium under pressure to one actuator chamber so as to maintain the actuator fully retracted and means for interconnecting the actuator chambers so as to effect movement of the actuator piston to the fully extended position.

The aforementioned and other objects are accomplished in the present invention by embodying a frangible seal in the piston and means for rupturing the seal so as to interconnect the opposed actuator chambers. Specifically, the actuator comprises a cylinder having a reciprocable piston disposed therein. The piston includes an integral hollow rod having a closed outer end which extends outside of one end of the cylinder for attachment to a suitable load device. The cylinder is designed for attachment to a fixed support. The piston divides the cylinder into a retract chamber and an extend chamber, and by virtue of the integral piston rod, the area of the piston exposed to the retract chamber is smaller than the area of the piston exposed to the extend chamber.

The piston carries a pair of split metallic piston rings which tend to expand so as to sealingly engage the cylinder bore. The cylinder is formed with an enlarged groove adjacent the rod end thereof so as to form a shoulder whereby when the actuator piston is moved to the fully extended position, the outer piston ring will expand into the groove and engage the shoulder so as to lock the piston in the fully extended position.

In addition, the piston is formed with a passage therethrough, which passage is normally closed by a frangible seal. A reciprocable rupture pin is mounted in the head end cap of the cylinder and extends into the passage of the piston when the actuator is fully retracted. When the rupture pin is manually struck the frangible seal is broken, thereby interconnecting the retract and extend chambers. Since the area of the piston exposed to the extend chamber is greater than the area of the piston exposed to the retract chamber, the gaseous fluid medium under pressure will flow from the retract chamber to the extend chamber so as to effect movement of the actuator piston to the fully extended position.

The control system for the instant actuator includes means for continuously maintaining the retract chamber under pressure. Thus, the cylinder has a porting block attached thereto including a manually operable valve through which the retract chamber is charged with air under pressure. This air under pressure maintains the actuator piston fully retracted. When it is desired to extend the actuator, it is only necessary to strike the rupture pin whereupon the frangible seal in the piston will be broken allowing air to flow from the retract chamber to the extend chamber so as to effect rapid movement of the actuator piston from the fully retracted position to the fully extended position where the actuator will be locked by the piston rings as aforedescribed.

Further objects and advantages of the present invention will be apparent from the following description, reference being had to the accompanying drawing, wherein a preferred embodiment of the present invention is clearly shown.

In the drawing:

Figure 1 is a longitudinal sectional view of an actuator constructed according to the present invention in the fully retracted position.

Figure 2 is a fragmentary longitudinal sectional view of the actuator in the fully extended position.

Figure 3 is an enlarged sectional view of the piston head passage and rupture pin.

With particular reference to Figure 1, a linear actuator is shown including a cylinder 10 having externally threaded flanged ends 12 and 14. The cylinder 10 is formed with an enlarged groove 16 adjacent the rod end so as to form an internal shoulder 18, the purpose of which will be described hereinafter. A rod end cap 20 having a central opening 22 is attached to the cylinder 10 by a nut 24 which engages the externally threaded portion 12 on the cylinder 10. A metallic O-ring seal 26 is interposed between the surfaces of the end cap 20 and the cylinder 10.

The head end of the cylinder 10 is closed by a cap 28 having a fixture 30 by which the actuator cylinder can be attached to a fixed support, not shown. The head cap 28 is maintained in assembled relation with the cylinder 10 by a nut 32 which engages the externally threaded flange 14, a metallic O-ring seal 34 being disposed between the surfaces of the head end cap 28 and the cylinder 10. In addition, the cylinder 10 has a porting block 36 attached thereto by means of a weld 38. The porting block 36 includes a nipple portion 40 having a passage 42 which can be connected to a suitable source of air under pressure, not shown. The passage 42 connects with a port 44 which is controlled by a throttle valve 46 having threaded engagement with the porting block 36. The port 44 connects with a passage 48, and the passage 48 communicates with a cylinder port 50.

A reciprocable piston 52 is disposed within the cylinder 10, and divides the cylinder 10 into an extend chamber 56 and a retract chamber 54. The cylinder port 50 normally communicates with the retract chamber 54. The piston 52 has an annular groove 58 within which a pair of split metallic piston rings 60 and 62 are disposed. The piston rings 60 and 62 tend to expand outwardly so as to sealingly engage the cylinder bore. In addition, the piston includes an integral hollow rod 64 having a closed outer end which extends through the opening 22 in the rod end cap 20. The outer end of the piston rod 64 is attached to a fixture 66 which can be connected to a suitable load device, not shown, whereby relative rotation between the piston and the cylinder is precluded.

A metallic O-ring seal 68 is disposed between the end cap 20 and the fixture 66 when the actuator is fully retracted as shown in Figure 1, the fixture 66 being threadedly connected to the rod 64 to compress the O-ring 68. In addition, the rod end cap 20 is formed with an annular groove 70 within which a pair of split metallic piston rings 72 and 74 are disposed, the piston rings 72 and 74 tending to contract so as to sealingly engage the outer periphery of the rod 64. The piston rod 64 also has a radial passage 76 therethrough adjacent the piston head whereby the hollow interior of the piston rod is connected at all times with the retract chamber 54.

The piston 52 has a plate 78 welded thereto as indicated by numeral 80 which closes the inner end of the hollow piston rod. In addition, the piston 52 has a passage 82 formed therethrough, which passage is normally closed at the rod end piston surface by a glass seal 84. Thus, the area of the piston exposed to the retract chamber 54 is less than the area of the piston exposed to the extend chamber 56, the difference in area being equal to the area of a circle defined by the outer diameter of the piston rod 64. The passage 82 in the piston 52 receives the larger diameter portion of a rupture pin 86 having a tapered end 87 which extends through the head end cap 28. As seen particularly in Figure 3, the diameter of the passage 82 through the piston 52 is greater than the diameter of the enlarged portion of the rupture pin 86. The smaller diameter portion of the rupture pin 86, which extends through the head end cap 28 is snugly fitted therein, and forms a shoulder 88 which abuts the inner surface of the head end cap 28 when the actuator is fully retracted as shown in Figure 1. In addition, when the actuator piston is in the fully retracted position, it engages a metallic O-ring seal 90 carried by the head end cap 28.

The control system for the actuator comprises the throttle valve 46 and the rupture pin 86. The actuator is assembled with the piston substantially fully retracted so that when the throttle valve 46 is opened, air under pressure from the supply tank, not shown, is admitted to the retract chamber 54 through passage 42, port 44, passage 48 and port 50. This air under pressure acting on the smaller area of the piston 52 will move and maintain the actuator piston in the fully retracted position as shown in Figure 1. Then, the fixture 66 is tightened on the rod to compress the O-ring 68. Thereafter, with the actuator charged to the required pressure, the valve 46 is closed as seen in Figure 2. In order to effect movement of the actuator piston 52 to the fully extended position, the rupture pin 86 is struck thereby moving the rupture pin 86 inwardly to the position of Figure 2 so as to break the frangible seal 84. When the seal 84 is broken, air under pressure from the retract chamber 54 flows through the space between the enlarged end of the rupture pin 86 and the passage 82 into the extend chamber 56. Since the area of the piston 52 exposed to the extend chamber is appreciably greater than the area of the piston exposed to the retract chamber, the piston 52 will move from the position of Figure 1 to the position of Figure 2. This piston movement will occur since the extend and retract chambers are interconnected through the passage 82 are subjected to the same pressure. When the actuator piston arrives at the fully extended position, the metallic piston rings 60 and 62 will expand outwardly into the groove 16, and the outer piston ring 62 will engage the shoulder 18 as well as the piston ring groove 58 so as to lock the actuator piston against movement in the fully extended position.

While the embodiment as herein disclosed constitutes a preferred form, it is to be understood that other forms might be adopted.

What is claimed is as follows:

1. An actuator assembly including, a cylinder, a reciprocable piston disposed in said cylinder and dividing said cylinder into opposed chambers, said piston having a smaller area exposed to one chamber than to the other chamber and having a passage therethrough for interconnecting said chambers, sealing means normally closing said piston passage, and externally accessible means for rupturing said sealing means to interconnect said opposed chambers.

2. An actuator assembly including, a cylinder, a reciprocable piston disposed in said cylinder and dividing said cylinder into opposed chambers, said piston having a smaller area exposed to one chamber than to the other chamber and having passage means therethrough, a frangible seal normally closing the passage means in said piston, and a reciprocable rupture pin supported by said cylinder and extending into said passage means for breaking said frangible seal to interconnect said opposed chambers.

3. A control system for a pneumatically operated actuator of the type comprising a cylinder having a reciprocable piston disposed therein, said piston dividing said cylinder into two chambers and having a smaller area exposed to one chamber than to the other chamber, including in combination, means for charging said one chamber with air under pressure to maintain said piston fully retracted, and externally accessible means for interconnecting said chambers internally of said cylinder whereby the air under pressure will flow from said one chamber to the other chamber to effect movement of the piston to the fully extended position.

4. A control system for a pneumatically operated actuator of the type comprising a cylinder having a reciprocable piston disposed therein, said piston dividing said cylinder into two chambers and having a smaller area exposed to one chamber than to the other chamber, and mechanical means for locking said piston against movement in the fully extended position, including in combination, manually operable valve means for charging said one chamber with air under pressure to maintain said piston in the fully retracted position, and means for interconnecting said chambers whereby the air under pressure will flow from said one chamber to said other chamber to effect movement of the piston to the fully extended position where said piston will be restrained against movement by said mechanical locking means.

5. A control system for a pneumatically operated actuator of the type comprising a cylinder having a reciprocable piston disposed therein, said piston dividing said cylinder into two chambers and having a smaller area exposed to one chamber than to the other chamber, said piston having passage means therethrough, and frangible sealing means normally closing said piston passage, including in combination, means for charging said one chamber with air under pressure to maintain said piston fully retracted, and means for rupturing said frangible sealing means to interconnect said chambers whereby the air under pressure will flow fom said one chamber to the other chamber to effect movement of said piston to the fully extended position.

6. An actuator assembly including, a cylinder, a reciprocable pison disposed in said cylinder and dividing said cylinder into opposed chambers, said piston having a smaller area exposed to one chamber than to the other chamber and having passage means therethrough, means normally closing the passage means in said piston, and externally accessible means for opening said passage means to interconnect said opposed chambers.

7. A pneumatically operated actuator including, a cylinder, a reciprocable piston disposed in said cylinder and dividing said cylinder into opposed chambers, said piston having a smaller area exposed to one chamber than to the other chamber and having a passage therethrough for interconnecting said chambers, porting means attached to said cylinder for supplying air under pressure to said one chamber so as to maintain said piston fully retracted, means normally closing said piston passage, and externally accessible means for opening said piston passage to interconnect said opposed chambers whereby the air under pressure will flow from said one chamber to the other chamber to effect movement of said piston to the fully extended position.

8. A pneumatically operated actuator including, a cylinder, a reciprocable piston disposed in said cylinder and dividing said cylinder into opposed chambers, said piston having a smaller area exposed to one chamber than to the other chamber and having a passage therethrough for interconnecting said chambers, a porting block attached to said cylinder including throttle valve means for charging said one chamber with air under pressure so as to maintain said piston in the fully retracted position, frangible sealing means normally closing said piston passage, and externally accessible means for rupturing said frangible sealing means to interconnect said opposed chambers whereby air under pressure will flow from said one chamber to the other chamber and effect movement of said piston to the fully extended position.

9. A control system for a pneumatically operated acuator of the type comprising a cylinder having a reciprocable piston disposed therein, said piston dividing said cylinder into two chambers and having a smaller area exposed to one chamber than the other chamber, said piston also having a rod extending through one end of and outside of said cylinder, and compressible sealing means circumscribing said rod externally of said cylinder, including in combination, means for charging said one chamber with gaseous fluid medium under pressure to maintain said piston fully retracted, manually adjustable fixture means carried by said rod and engageable with said sealing means to compress the same when said piston is fully retracted, and means operable to interconnect said chambers whereby the gaseous medium under pressure will flow from said one chamber to the other chamber to effect movement of the piston to the fully extended position.

10. An actuator assembly including, a cylinder, a reciprocable piston disposed in said cylinder and dividing said cylinder into opposed chambers, said piston having a smaller area exposed to one chamber than to the other chamber and having passage means therethrough, means normally closing the passage means in said piston, said piston including a rod extending through one end of and outside of said cylinder, compressible sealing means circumscribing said rod exteriorly of said cylinder, porting means attached to said cylinder for supplying air under pressure to said one chamber so as to maintain said piston fully retracted, manually adjustable fixture means carried by said rod and engageable with said sealing means to compress said sealing means when the piston is fully retracted, and means operable to open the passage means in said piston to interconnect the opposed chambers whereby the air under pressure will flow from said one chamber to the other chamber to effect movement of said piston to the fully extended position.

References Cited in the file of this patent
UNITED STATES PATENTS

| | | |
|---|---|---|
| 1,529,434 | Hynes | Mar. 10, 1925 |
| 2,687,706 | Glenny | Aug. 31, 1954 |
| 2,703,558 | Wilcox | Mar. 8, 1955 |
| 2,746,425 | Schafer | May 22, 1956 |
| 2,751,822 | Schiltz | June 26, 1956 |